United States Patent
Dolin et al.

(10) Patent No.: US 7,933,916 B2
(45) Date of Patent: Apr. 26, 2011

(54) QUERYING NONSQL DATA STORES WITH A SQL-STYLE LANGUAGE

(75) Inventors: Robert M. Dolin, Seattle, WA (US); Gregory S. Friedman, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 392 days.

(21) Appl. No.: 12/039,442

(22) Filed: Feb. 28, 2008

(65) Prior Publication Data

US 2009/0222404 A1    Sep. 3, 2009

(51) Int. Cl.
G06F 7/00 (2006.01)
G06F 17/30 (2006.01)

(52) U.S. Cl. .................................................. 707/760
(58) Field of Classification Search ............... 707/760, 707/999.004
See application file for complete search history.

(56) References Cited

U.S. PATENT DOCUMENTS

| | | | |
|---|---|---|---|
| 5,379,419 A | 1/1995 | Heffernan et al. | |
| 5,819,251 A | 10/1998 | Kremer et al. | |
| 5,826,258 A | 10/1998 | Gupta et al. | |
| 6,282,537 B1 | 8/2001 | Madnick et al. | |
| 6,502,088 B1 | 12/2002 | Gajda et al. | |
| 6,795,825 B2 | 9/2004 | Rishe | |
| 7,146,356 B2 | 12/2006 | Choi et al. | |
| 2003/0158855 A1* | 8/2003 | Farnham et al. | 707/102 |
| 2003/0195862 A1 | 10/2003 | Harrell, Jr. | |
| 2004/0143569 A1 | 7/2004 | Gross et al. | |
| 2006/0100989 A1* | 5/2006 | Chinchwadkar et al. | 707/3 |
| 2006/0235823 A1 | 10/2006 | Chong et al. | |
| 2007/0276787 A1* | 11/2007 | Piedmonte | 707/2 |

OTHER PUBLICATIONS

Carey et al., "Towards Heterogeneous Multimedia Information Systems: The Garlic1 Approach," Proc. RIDE-DOM '95 (5th International Workshop on Research Issues in Data Engineering: Distributed Object management), 1995, pp. 124-131, US.
Melton, et al., "SQL and Management of External Data," SIGMOD Record, vol. 30, No. 1, Mar. 2001, pp. 70-77, US.
Reinwald et al., "Heterogeneous Query Processing Through SQL Table Functions," printed from http://ieeexplore.ieee.org/ie14/6088/16304/00754952.pdf?tp=&arnumber=754952&isnumber=16304, 8 pages, US.
Manolescu et al., "Answering XML Queries Over Heterogeneous Data Sources," printed from http://feast.ucsd.edu/CSE291-SP03/agoraVLDB2001.ps, 11 pages, US.

* cited by examiner

*Primary Examiner* — Hosain T Alam
*Assistant Examiner* — Van H Oberly
(74) *Attorney, Agent, or Firm* — Senniger Powers LLP

(57) ABSTRACT

A nonSQL index containing data associated with a social networking network is queried with a nonSQL query generated from a SQL query. A query translation component parses the SQL query for query parameters specifying requested data and identifies a type of the nonSQL index based on the nonSQL index. The query translation component generates a nonSQL query based on the query parameters and the type of nonSQL index and queries the nonSQL index with the generated nonSQL query to search for the requested data. The query translation component receives a nonSQL result set from the nonSQL index based on the nonSQL query and then transforms the nonSQL result set into a SQL result set based on the type of nonSQL index and the received SQL query.

13 Claims, 3 Drawing Sheets

QUERYING NONSQL DATA STORES WITH A SQL-STYLE LANGUAGE

BACKGROUND

As data stores expand, standard SQL-style tables are no longer optimal (or even capable) of storing the data and executing queries. However, programmers (and programs) have built-up skills in composing, manipulating, and executing SQL queries. For example, consider searching for People from Seattle in a web space of a social network. In an underlying nonSQL-type search index such as this, a query similar to the following may be needed:

meta:search.pt(people) meta:search.location(seattle) site:web.spaces.live.com.

Unfortunately, that query syntax is likely unfamiliar to a relatively new programmer or a programmer unfamiliar with the underlying data store implementation. But the following SQL like query:

SELECT*FROM People WHERE Location="seattle"

is consistent with a SQL syntax that a programmer likely learned in school or is otherwise familiar to the programmer. Thus, a programmer unfamiliar with the underlying data store implementation of a social network and the corresponding indexes would have to spend time learning the underlying data store implementation and the query languages needed to query these indexes. Also, every time there was a change to the underlying data store implementation, the programmer would have to check every query in every application leading to inefficient and expensive maintenance costs.

SUMMARY

Aspects of the invention permit querying a nonSQL index or other nonSQL-type data structure with a nonSQL query generated from a SQL query. Being able to translate SQL-style queries to the underlying nonSQL-style data structures allows for more efficient and quickly learned coding of programs. The nonSQL query is used to query the nonSQL index to obtain a nonSQL result set which is in turn transformed into a SQL result set. An aspect of the invention includes a query translation component that parses the SQL query and identifies a type of the nonSQL index. The query translation component generates a nonSQL query based on the parsed SQL query and the type of nonSQL index and queries the nonSQL index with the generated nonSQL query to search for the requested data. The query translation component receives a nonSQL result set from the nonSQL index based on the nonSQL query and then transforms the nonSQL result set into a SQL result set based on the type of nonSQL index and the received SQL query.

In another aspect, the query translation component generates a plurality of nonSQL queries from the parsed SQL query and the type of nonSQL index. The query translation component queries the nonSQL indexes with the generated nonSQL queries to search for the requested data. The query translation component merges the plurality of nonSQL result sets from the nonSQL index based on the nonSQL queries and then transforms the nonSQL result sets into a SQL result set based on the type of nonSQL index and the received SQL query.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
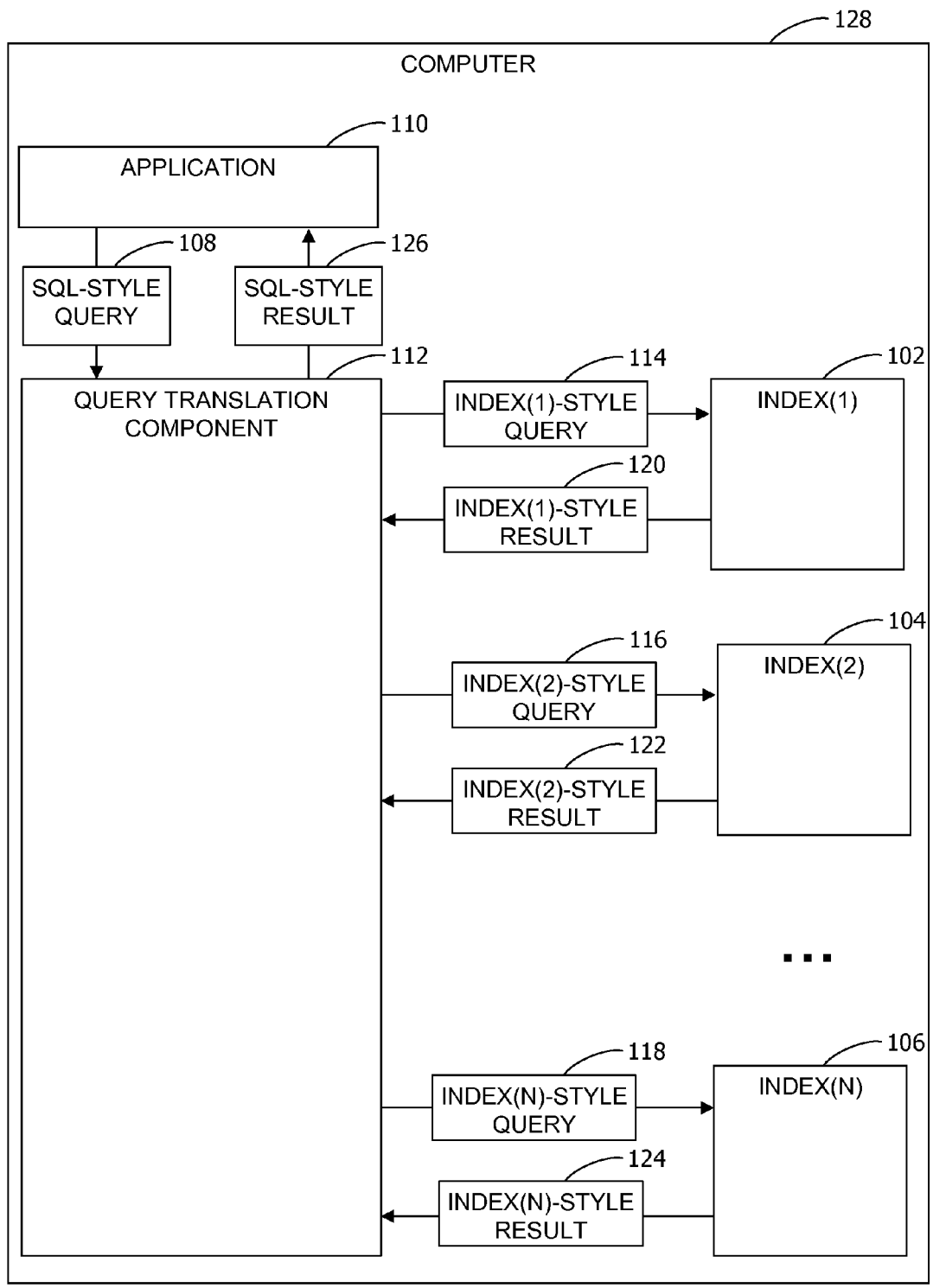
FIG. 1 is a block diagram illustrating one example of a suitable computing system environment in which the invention may be implemented.

Aspects of the invention allow a nonSQL index to be queried utilizing a SQL index. In particular, the invention embodying these aspects includes querying a nonSQL index with a nonSQL query generated from a SQL query. FIG. 1 is a block diagram illustrating one example of a suitable computing system environment for querying a plurality of nonSQL indexes (e.g., index 102, index 104, index 106) with a SQL query 108.

The system includes an application 110, the plurality of nonSQL indexes, and a query translation component 112. The application 110 generates the SQL query 108. In an embodiment, the application 110 provides one or more social networking services and the plurality of nonSQL indexes are associated with data related to at least one of the social networking services provided by the application 110. For example, the data could be an online address book or a collection of web spaces. And the social networking services may include but are not limited to one or more of the following: an email service, an instant messaging service, a photo sharing service, a web space service, and a blog service. Alternatively, the application 110 may provide services related to corporate directories, consumer purchasing behavior or other applications where large heterogeneous data sets are queried.

The query translation component 112 receives the SQL query 108 from the application 110. In an embodiment, the SQL query 108 is used to search for one or more of the following: an email message, a friend, a photo, a video, and a blog entry. Additionally, the query translation component 112 parses the received SQL query 108 for query parameters.

For each for each of the nonSQL indexes, the query translation component 112 (1) identifies a type of the nonSQL index based on the nonSQL index (e.g., index 102, index 104, index 106); (2) generates a nonSQL query (e.g., index-style query 114, index-style query 116, index-style query 118) based the query parameters and the type of nonSQL index; (3) queries the nonSQL index with the generated nonSQL query; and (4) receives a nonSQL result set (e.g., index-style result 120, index-style result 122, index-style result 124) from the nonSQL index based on the nonSQL query. In an embodiment, the nonSQL index type includes one or more of the following: a flat file, a relationship graph, an array, a hashtable, and a chunked keyword index.

The query translation component 112 merges each of the received plurality of nonSQL result sets (e.g., index-style result 120, index-style result 122, index-style result 124) into a SQL result set 126 based on the parsed query parameters and the received SQL query 108. The query translation component 112 returns the SQL result set 126 to the application 110.

In an embodiment, the nonSQL index type is a chunked keyword index, such as those used in Web search indexes or graph data representations used by social networks. To parse the SQL query 108, the query translation component 112 identifies the query parameters from a table list of a FROM clause of the SQL query. The query parameters include the table list in a normalized syntax (e.g., Spaces, People, Blogs, Photos). And the query translation component 112 identifies query parameters from a search condition of a WHERE clause of the SQL query 108. These query parameters include the search condition in a matching metadata syntax (e.g., location="seattle", tag="basketball").

In another embodiment, the nonSQL index type is a relationship graph. To parse the SQL query 108, the query translation component 112 identifies query parameters from a table list of a FROM clause of the SQL query. The query parameters are filters on the nodes of the relationship graph. And, the query translation component 112 identifies query parameters from a search condition of a WHERE clause of the SQL query 108. These query parameters are filters on the edges of the relationship graph.

For example, for a relationship graph consisting of people and groups, the FROM clause is translated as a filter on the nodes. And, the WHERE clause is treated as a filter on the edges (e.g., WHERE RelationshipType="friend") or as a filters on the nodes (e.g., WHERE GroupName="GenObama"). Furthermore, depending on the scope of the query, the entire graph could be traversed or the graph may be traversed for a limited breadth.

Figure 2:
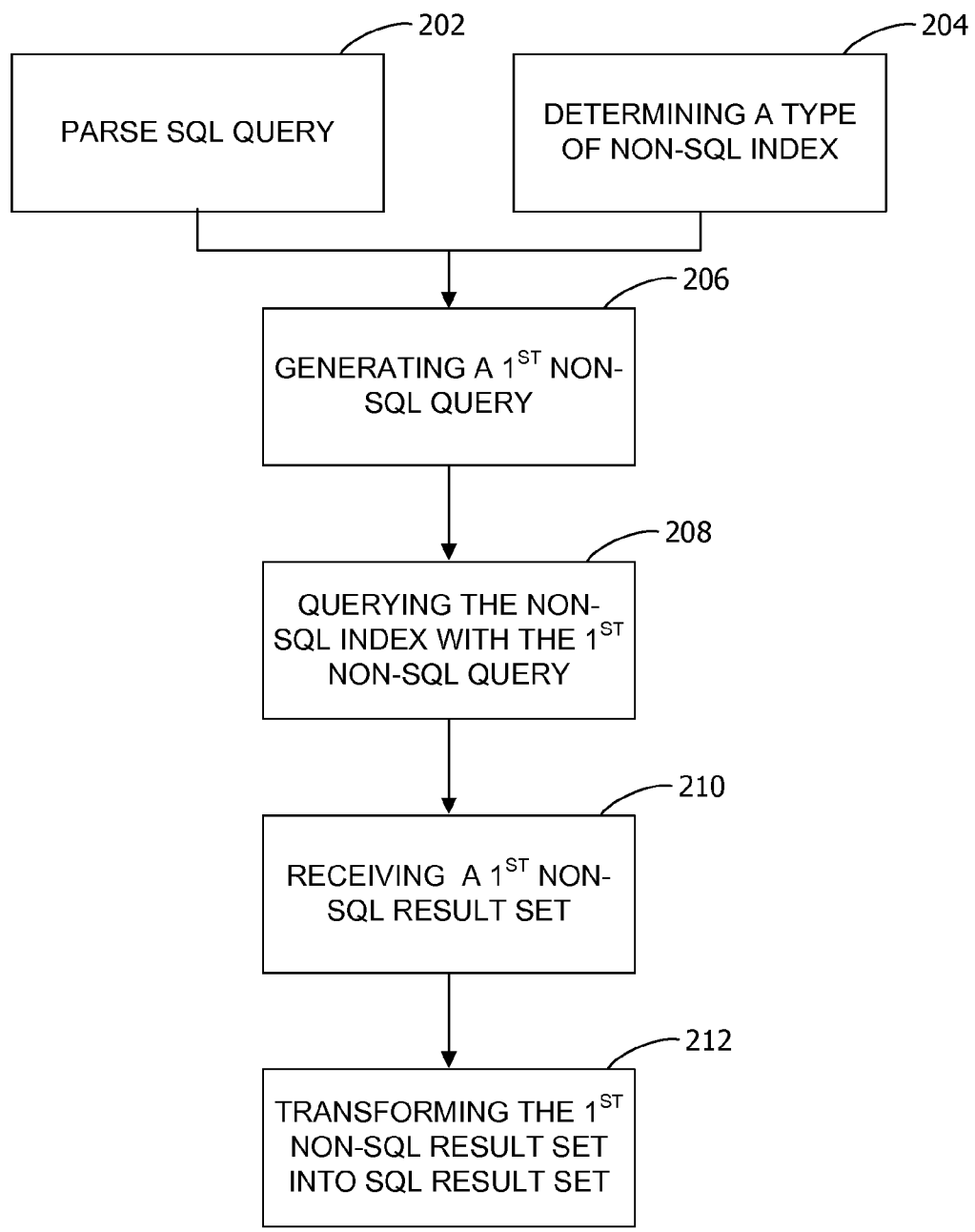
FIG. 2 is an exemplary flow diagram for a method for querying a nonSQL index with a SQL query.

FIG. 2 is an exemplary flow diagram for a method for querying a nonSQL index (e.g., index 102, index 104, index 106) with the SQL query 108. In an embodiment, the nonSQL index contains data associated with a social networking network. At 202, the query translation component 112 parses the SQL query 108 for query parameters. In an embodiment, the query parameters specify data associated with the social networking network.

At 204, query translation component 112 identifies a type of the nonSQL index based on the nonSQL index. In an embodiment, the nonSQL index type includes one or more of the following: a flat file, a relationship graph, an array, a hashtable, and a chunked keyword index.

As shown at 206 of FIG. 2, the query translation component 112 generates a first nonSQL query (e.g., index-style query 114, index-style query 116, index-style query 118) based on the query parameters and the type of nonSQL index. And at 208, the query translation component 112 queries the nonSQL index with the generated first nonSQL query to search for the requested data.

At 210, the query translation component 112 receives a first nonSQL result set (e.g., index-style result 120, index-style result 122, index-style result 124) from the nonSQL index based on the first nonSQL query. Advantageously, a programmer can use a familiar SQL query language to query the nonSQL index such as a chunked keyword index or a relationship graph without having to learn the syntax used to query these types of indexes.

In an alternative embodiment, the query translation component 112 generates a second nonSQL query based on the query parameters and the first nonSQL result set and queries the nonSQL index with the generated second nonSQL query. The query translation component 112 receives a second nonSQL result set from the nonSQL index based on the second nonSQL query. In this embodiment, the SQL result set 126 is generated from the second nonSQL result based on the type of nonSQL index and the received SQL query 108.

For example, suppose a user wants to search for blog entries from friends about George W. Bush using the following SQL query:

> SELECT UserID, Title, Link, Summary FROM tblBlogs
> WHERE Description LIKE "George W. Bush" AND Degree=1

The query translation component 112 may break the SQL query into two nonSQL queries to search the nonSQL index. First, to a social graph type index, a nonSQL query
   List(<user's ID>, 1)
queries the social graph type index for the list of people are 1 degree away (a friend) from the searcher. And, a second query based on the first nonSQL result set is submitted to a chunked keyword index to get a list of blog entries using the query:

> "George Bush" meta:search.pt(blogs) (meta.search.author(<friend1's ID>)
> OR meta:search.author(<friend2's ID>) OR ...)

Proceeding to 212 of FIG. 2, the query translation component 112 transforms the first nonSQL result set into a SQL result set 126 based on the type of nonSQL index and the received SQL query 108, said SQL result set 126 containing the requested data associated with the social networking network.

In an embodiment, the nonSQL index type is a chunked keyword index. To parse the SQL query 108, the query translation component 112 identifies the query parameters from a table list of a FROM clause of the SQL query. The query parameters include the table list in a normalized syntax. And, the query translation component 112 identifies query parameters from a search condition of a WHERE clause of the SQL query 108. These query parameters include the search condition in a matching metadata syntax. Furthermore, in this embodiment, if the SQL query 108 includes a range, the identified query parameters include a series of OR syntax elements, one for each element in the range. The range may include, but is not limited to, one or more of the following: a date range, a numeric range, an alphabetic range, an enumerated list, a list of elements, and a geographic range.

In another embodiment, the nonSQL index type is a relationship graph. To parse the SQL query 108, the query translation component 112 identifies query parameters from a table list of a FROM clause of the SQL query. The query parameters are filters on the nodes of the relationship graph. And, the query translation component 112 identifies query parameters from a search condition of a WHERE clause of the SQL query 108. These query parameters are filters on the edges of the relationship graph.

Figure 3:
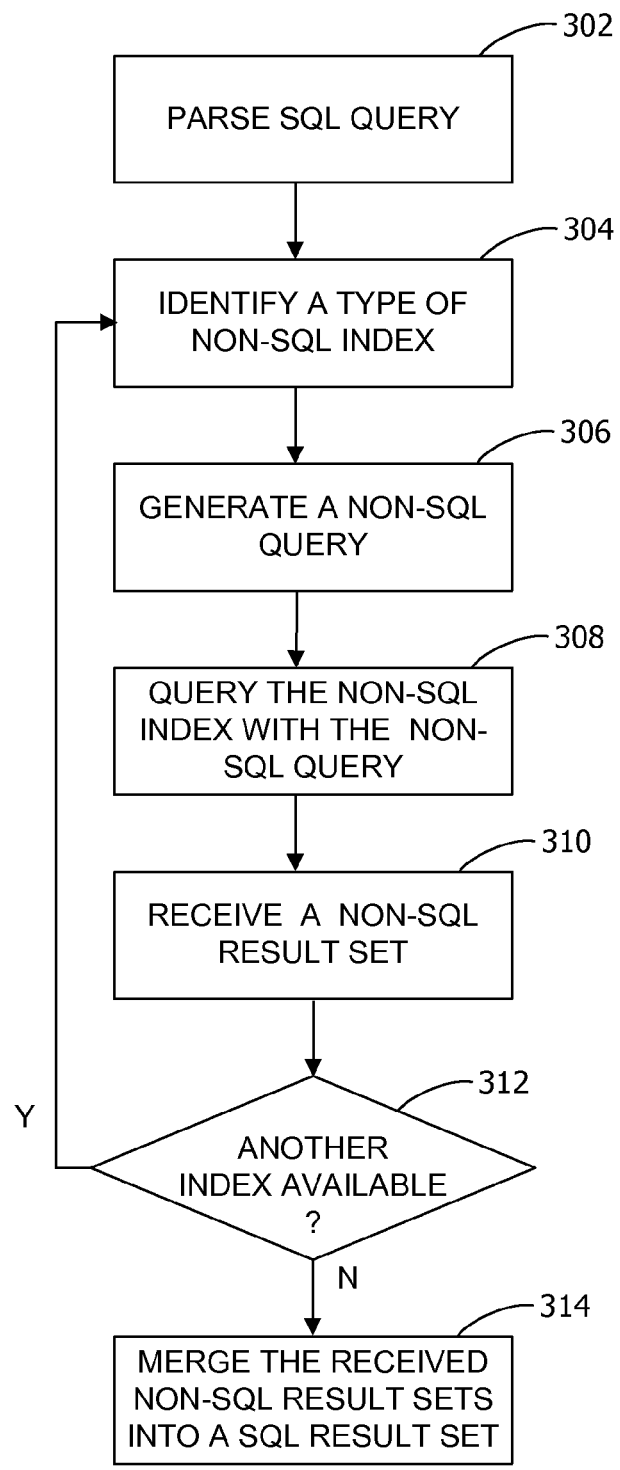
FIG. 3 is an exemplary flow diagram for a method for querying a plurality of nonSQL indexes with a SQL query.

FIG. 3 is an exemplary flow diagram for method for querying a plurality of nonSQL indexes (e.g., index 102, index 104, index 106) with a SQL query 108. In an embodiment, the SQL query 108 requests data associated with a social networking network.

At 302, the query translation component 112 parses the SQL query 108 for query parameters. In an embodiment, the query parameters specify data associated with the social networking network. And, at 304, the query translation component 112 identifies a type of the nonSQL index based on the nonSQL index. In an embodiment, the nonSQL index type includes one or more of the following: a flat file, a relationship graph, an array, a hashtable, and a chunked keyword index.

At 306, the query translation component 112 generates a nonSQL query (e.g., index-style query 114, index-style query 116, index-style query 118) based the query parameters and the type of nonSQL index and, at 308, the query translation component 112 queries the nonSQL index with the generated nonSQL query.

At 310, the query translation component 112 receives a nonSQL result set (e.g., index-style result 120, index-style result 122, index-style result 124) from the nonSQL index based on the nonSQL query. And, at 312, the query translation component 112 determines if another nonSQL index is available. If so, steps 304 through 312 are repeated for each of the nonSQL indexes. For ease of explanation, FIG. 3 illustrates a method where steps 304 through 312 are repeated serially for each of the nonSQL indexes. However, one skilled in the art can appreciate that the steps 304 through 312 may be performed in parallel for each of the nonSQL indexes in alternative embodiments. And in either case, multiple nonSQL indexes can be searched utilizing a single SQL query. Furthermore, the query translation component 112 can query new nonSQL indexes as they become available to obtain the requested data without having to modify the application 110. And, the application 110 programmer does not have to understand or modify the underlying nonSQL queries as the nonSQL indexes are modified over time.

If another nonSQL index is not available at 314, the query translation component 112 merges each of the received plurality of nonSQL result sets into a SQL result set 126 based on the parsed query parameters and the received SQL query 108. The SQL result set 126 contains the requested data associated with the social networking network from the plurality of nonSQL indexes.

For example, suppose there are three indexes available, Index 1 is a user data list in a flat file structure indexed by offsets from user ID, Index 2 is a relationship graph, and Index 3 is a chucked keyword search index. The user wants to search for Friends or Friends-of-Friends from Seattle using the following SQL query:

```
SELECT UserID, UserName
FROM tblPeople
WHERE Location=Seattle AND Degree <= 2
```

The query translation component 112 translates the SQL query into two nonSQL queries. First, to Index 3, the social graph is queried for people less than or equal to two (2) degrees away (Friends or Friends-of-Friends) and from the searcher using the following relationship graph query: List (<user's ID>,2). Second, Index 1, the user data list, queried to get each friend and friends-of-friends location. The query translation component 112 then filters out friend and friends-of-friends who are not located Seattle from the nonSQL result set.

Referring again to FIG. 1, FIG. 1 shows one example of a general purpose computing device in the form of a computer 128. In one embodiment, a computer such as the computer 128 is suitable for use in the other figures illustrated and described herein. Computer 128 has one or more processors or processing units and a system memory.

The computer 128 typically has at least some form of computer readable media. Computer readable media, which include both volatile and nonvolatile media, removable and non-removable media, may be any available medium that may be accessed by computer 128. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 128.

Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The computer 128 may also include other removable/non-removable, volatile/nonvolatile computer storage media. The drives or other mass storage devices and their associated computer storage media discussed above, provide storage of computer readable instructions, data structures, program modules and other data for the computer 128.

The computer 128 may operate in a networked environment using logical connections to one or more remote computers. The remote computer may be a personal computer, a server, a router, a network PC, a peer device or other common network node, and typically includes many or all of the elements described above relative to computer 128. In a networked environment, program modules (e.g., application 110, query translation component 112) depicted relative to computer 128, or portions thereof, may be stored in a remote memory storage device (not shown). By way of example, and not limitation, FIG. 1 illustrates remote application programs 192 as residing on the memory device.

Generally, the data processors of computer 128 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 128, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computer 128 executes computer-executable instructions such as those illustrated in the figures to implement aspects of the invention. For example, computer 128 executes a method embodying aspects of the invention for querying a nonSQL index with a SQL query. The method includes parsing the SQL query for query parameters specifying requested data associated with a social networking network and identifying a type of the nonSQL index based on the nonSQL index. The method also includes generating a first nonSQL query based on the query parameters and the type of nonSQL index, querying the nonSQL index with the generated first nonSQL query to search for the requested data, receiving a first nonSQL result set from the nonSQL index based on the first nonSQL query, and transforming the first nonSQL result set into a SQL result set based on the type of nonSQL index and the received SQL query. The SQL result set contains the requested data associated with the social networking network.

In another embodiment, computer 128 executes a method for querying a plurality of nonSQL indexes with a SQL query, which includes parsing the SQL query for query parameters specifying requested data. For each of the nonSQL indexes, the method includes identifying a type of the nonSQL index based on the nonSQL index, generating a nonSQL query based the query parameters and the type of nonSQL index, querying the nonSQL index with the generated nonSQL query, and receiving a nonSQL result set from the nonSQL index based on the nonSQL query. Then the method includes merging each of the received plurality of nonSQL result sets into a SQL result set based on the parsed query parameters and the received SQL query. The SQL result set contains the requested data from the plurality of nonSQL indexes.

A system for querying a plurality of nonSQL indexes with a SQL query also embodies aspects of the invention. The system includes an application providing one or more social networking services for generating the SQL query and a plurality of nonSQL indexes associated with data related to at least one of the social networking services provided. The system further includes a query translation component for receiving the SQL query from the application and parsing the received SQL query for query parameters. For each of the nonSQL indexes, the query translation component is for identifying a type of the nonSQL index based on the nonSQL index, generating a nonSQL query based the query parameters and the type of nonSQL index, querying the nonSQL index with the generated nonSQL query, and receiving a nonSQL result set from the nonSQL index based on the nonSQL query. The query translation component is also for merging each of the received plurality of nonSQL result sets into a SQL result set based on the parsed query parameters and the received SQL query and returning the SQL result set to the application.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for querying a nonSQL index with a SQL query, said nonSQL index containing data associated with a social networking network, said method comprising:
  parsing the SQL query for query parameters, said query parameters specifying requested data associated with the social networking network, said parsing comprising:
    generating query parameters from a table list of a FROM clause of the SQL query, wherein said query parameters include the table list in a normalized syntax; and
    generating query parameters from a search condition of a WHERE clause of the SQL query, wherein said query parameters include the search condition in a matching metadata syntax;

identifying a first nonSQL index type and a second nonSQL index type of the nonSQL index based on the query parameters, said second type different from said first type;
generating a first nonSQL query based on the query parameters and the first type of nonSQL index;
querying the nonSQL index with the generated first nonSQL query;
receiving a first nonSQL result set from the nonSQL index based on the first nonSQL query; and
generating a second nonSQL query based on the query parameters, the received first nonSQL result set and second type of the nonSQL index;
querying the nonSQL index with the generated second nonSQL query to search for the requested data;
receiving a second nonSQL result set from the nonSQL index based on the second nonSQL query;
transforming the second nonSQL result set into a SQL result set based on the second type of the nonSQL index and the received SQL query, said SQL result set containing the requested data associated with the social networking network,
wherein the SQL query includes a numeric range and the generated query parameters include a series of OR syntax elements, one for each number in the range.

2. The method of claim 1, wherein at least one of the nonSQL index types comprises a chunked keyword index.

3. The method of claim 2, wherein the SQL query includes a date range and the identified query parameters include a series of OR syntax elements, one for each date in the range.

4. The method of claim 1, wherein each nonSQL index type is one or of the following: a flat file, a relationship graph, an array, a hashtable, and a chunked keyword index.

5. One or more computer-readable storage media with instructions for performing the method of claim 1.

6. A method for querying a plurality of nonSQL indexes with a SQL query, said SQL query requesting data, said method comprising:
parsing the SQL query for query parameters, said query parameters specifying requested data, said parsing comprising:
generating query parameters from a table list of a FROM clause of the SQL query, wherein said query parameters are filters on the nodes of a relationship graph; and
generating query parameters from a search condition of a WHERE clause of the SQL query, wherein said query parameters are filters on the edges of the relationship graph;
simultaneously, for each of the nonSQL indexes:
identifying a nonSQL index type of the nonSQL index based on the nonSQL index;
generating a nonSQL query based the query parameters and the type of nonSQL index;
querying the nonSQL index with the generated nonSQL query; and
receiving a nonSQL result set from the nonSQL index based on the nonSQL query; and
merging each of the received plurality of nonSQL result sets into a SQL result set based on the parsed query parameters and the received SQL query, said SQL result set containing the requested data from the plurality of nonSQL indexes,
wherein each nonSQL index has a different nonSQL type from every other nonSQL index.

7. The method of claim 6, wherein each nonSQL index type is one the following: a flat file, a relationship graph, an array, a hashtable, and a chunked keyword index.

8. The method of claim 6, wherein at least one of the nonSQL index types is a relationship graph.

9. A system for querying a plurality of nonSQL indexes with a SQL query comprising:
an application for generating the SQL query, said application providing one or more social networking services;
a plurality of nonSQL indexes associated with data related to at least one of the social networking services provided;
a processor configured to execute a query translation component for:
receiving the SQL query from the application;
parsing the received SQL query for query parameters, said parsing comprising:
identifying query parameters from a table list of a FROM clause of the SQL query, wherein said query parameters include the table list in a normalized syntax; and
identifying query parameters from a search condition of a WHERE clause of the SQL query, wherein said query parameters include the search condition in a matching metadata syntax;
simultaneously, for each of the nonSQL indexes:
identifying a type of the nonSQL index based on the nonSQL index;
generating a nonSQL query based the query parameters and the type of nonSQL index;
querying the nonSQL index with the generated nonSQL query; and
receiving a nonSQL result set from the nonSQL index based on the nonSQL query;
merging each of the received plurality of nonSQL result sets into a SQL result set based on the parsed query parameters and the received SQL query; and
returning the SQL result set to the application,
wherein the SQL query includes a date range and the identified query parameters include a series of OR syntax elements, one for each date in the range, and
wherein each nonSQL index has a different nonSQL type from every other nonSQL index.

10. The system of claim 9, wherein each nonSQL index type is one of the following: a flat file, a relationship graph, an array, a hashtable, and a chunked keyword index.

11. The system of claim 9, wherein at least one of the nonSQL index types is a chunked keyword index.

12. The system of claim 9, wherein the social networking services include one or more of the following: an email service, an instant messaging service, a photo sharing service, a web space service, and a blog service.

13. The system of claim 9, wherein the SQL query is used to search for one or more of the following: an email message, a friend, a photo, a video, and a blog entry.

* * * * *